May 27, 1947. W. J. EKINS 2,421,059

CLOTHES LINE PULLEY ASSEMBLY

Filed March 21, 1946

INVENTOR.
W. J. Ekins,
BY A. D. Adams
Attorney

Patented May 27, 1947

2,421,059

UNITED STATES PATENT OFFICE 2,421,059

CLOTHESLINE PULLEY ASSEMBLY

William J. Ekins, Cleveland, Ohio, assignor to The Auto Arc-Weld Manufacturing Co., Cleveland, Ohio, a corporation of Ohio Application March 21, 1946, Serial No. 656,131

1 Claim. (Cl. 254—190)

This invention pertains to pulleys and has more particular reference to pulley assemblies adapted to be used in supporting clothes lines.

When a clothes line is mounted on fixed pulleys (rotatable in a fixed plane) it is necessary that the pulleys be in alignment, otherwise, the clothes line will tend to pull out of the pulley groove or will cause the pulley to bind. In mounting clothes lines it is not always possible to find supports upon which the pulleys may be mounted in alignment. Pulley assemblies which provide for freedom of movement of the pulley are usually complicated structures and costly to manufacture.

One object of the present invention is to provide a pulley assembly comprising a mounting member having a curved shaft upon which the pulley is rotatably and oscillatably mounted.

Another object of the invention is to provide a pulley assembly which may be removably attached to a support.

Another object of the invention is to provide a pulley assembly in which a line may be readily mounted on or removed from the pulley.

A further object of the invention is to provide a pulley assembly which is simple and economical in construction.

With the foregoing and other objects in view, the invention consists in the construction, combination and arrangement of parts hereinafter described and illustrated in the drawings, in which.

Figure 1:
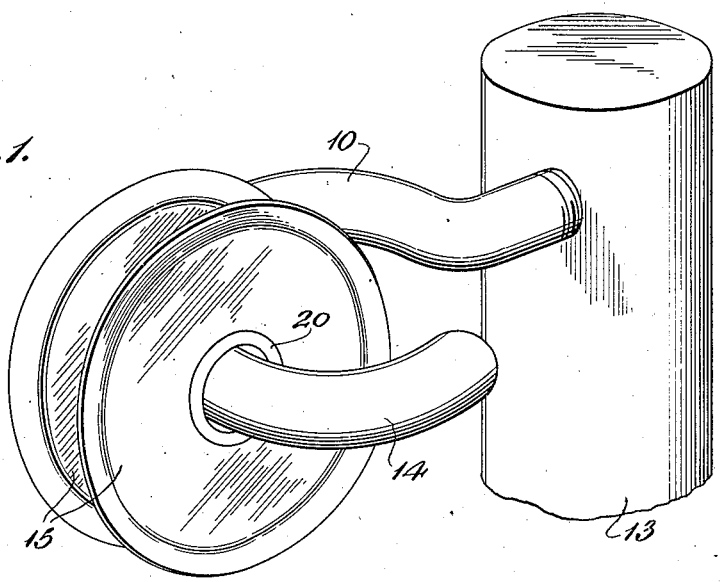
Fig. 1 is a perspective view of the pulley assembly mounted on a support.

Referring now to the several figures of the drawings, there is shown a mounting member 10, in the form of a hook, having a shank or tapered end 11, provided with detachable mounting means, such as screw threads 12, by means of which the member may be detachably fastened to a support, such as a post 13. The other end of the mounting member 10 is bent into the form of a circle forming a curved shaft 14 upon which a pulley is rotatably mounted. The curved shaft 14 is preferably made circular in cross section and is of uniform diameter throughout its length.

The pulley or wheel comprises a pair of flat discs 15, preferably stamped out of sheet metal and held together by means of a beaded tubular sleeve or rivet 16, preferably made of copper. In the particular embodiment of the invention shown, the curved end of the mounting member is not bent into a complete circle but stops short of the shank to leave an open space therebetween through which a clothes line, or the like, may readily be placed upon or removed from the pulley. Obviously, the circle could be completed, if desired, and the clothes line could be threaded into the pulley groove.

Each disc is provided with a central, circular opening 17 having its peripheral edge turned inwardly to form a flange 18. The rim of each disc is curved outwardly to form a peripheral flange 19.

Figure 2:
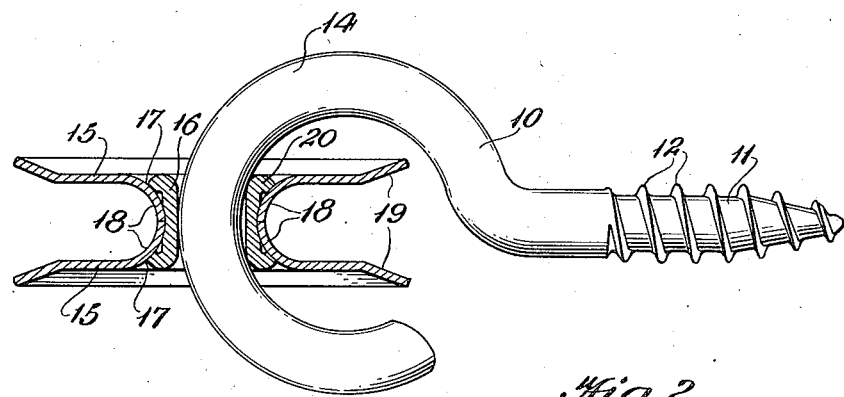
Fig. 2 is a plan view of the pulley assembly with the pulley shown in horizontal cross section.

In assembling the wheel, the discs 15 are mounted on the tubular sleeve or rivet 16 with their inwardly turned flanges 17 abutting and firmly and securely held together by crimping the ends of the sleeve 19 back upon the discs to form a bead 20. The outwardly flared flanges formed on the periphery of the discs facilitate the insertion of a line into the groove. The depth of the groove is made almost twice that of its width, as clearly shown in Fig. 2. This tends to prevent the line from slipping out of the groove.

Figure 3:
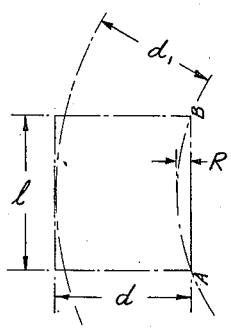
Fig. 3 is a diagrammatic view showing the dimensional relationships of the pulley hub or bearing to the mounting shaft.

The sleeve or rivet 19 forms a hub or bearing in which the curved shaft 14 is journalled. In order to permit the pulley to slide or oscillate freely upon the curved shaft, it is essential that the internal diameter of the bearing formed by the sleeve be equal to or greater than the diameter of the curved shaft 14, plus the rise of the arc of the circle formed by the inner circumference of the curved shaft, subtended by a chord equal in length to the length of the bearing. These relationships are clearly shown in Fig. 3, where $l$ indicates the length of the bearing; $d_1$ indicates the diameter of the curved shaft 14; AB indicates an arc on the circle representing the inner circumference of the curved shaft 14, subtended by a chord equal in length to the length of the bearing; and R indicates the rise of arc AB. In order that the pulley may freely oscillate on the curved shaft it is necessary that $d > d_1 + R$.

In a pulley assembly made in accordance with this invention, any sidewise pressure exerted on the pulley by the line mounted thereon would not tend to cause the pulley to bind, nor would the line be pulled out of the groove, because such pressure would merely cause the pulley to slide on the curved shaft.

While the invention has been described as applicable to and for a clothes line, other material, such as wire, cable, and the like, can be used with the pulley assembly for various purposes. Obviously, the invention is not restricted to the particular embodiment thereof herein shown and described. Moreover, it is not indispensable that all the features of the invention be used conjointly, since they may be employed advantageously in various combinations and sub-combinations.

What is claimed is:

A pulley assembly comprising a mounting member having an end portion thereof bent into circular shape to form a curved shaft having a screw threaded shank portion, said curved shaft being circular in cross section and of a uniform diameter throughout its length with the end of the shaft terminating short of the shank portion to provide a pulley receiving opening; a pulley mounted on said curved shaft and having a central bore forming a bearing in which said shaft is journaled, said bearing having an internal diameter slightly larger than the diameter of said shaft plus the rise of the arc of the circle formed by the inner circumference of said curved shaft subtended by a chord equal in length to the length of said bearing; said pulley including a pair of flat discs each having a central opening provided with an inwardly turned flange and having its rim outwardly swaged; a tubular sleeve upon which said discs are mounted with their inwardly turned flanges abutting; and a beading formed on the ends of said sleeve to firmly hold said discs together.

WILLIAM J. EKINS.

REFERENCES CITED

The following references are of record in the file of this patent:

UNITED STATES PATENTS

| Number | Name | Date |
|---|---|---|
| 2,228,346 | Downie | Jan. 14, 1941 |

FOREIGN PATENTS

| Number | Country | Date |
|---|---|---|
| 17,894 | Great Britain | 1905 |
| 19,170 | Denmark | Aug. 31, 1914 |
| 560,573 | France | Oct. 6, 1923 |